(12) United States Patent
Gourand

(10) Patent No.: US 7,286,752 B2
(45) Date of Patent: Oct. 23, 2007

(54) DEVICE FOR HEATING A LIQUID FOR DOMESTIC APPLIANCE, DOMESTIC APPLIANCE FITTED WITH SAID DEVICE

(75) Inventor: Thierry Gourand, Orchamps (FR)

(73) Assignee: SEB S.A., Ecully (FR)

( * ) Notice: Subject to any disclaimer, the term of this patent is extended or adjusted under 35 U.S.C. 154(b) by 11 days.

(21) Appl. No.: 10/555,645

(22) PCT Filed: Apr. 1, 2004

(86) PCT No.: PCT/FR2004/000821

§ 371 (c)(1),
(2), (4) Date: Nov. 4, 2005

(87) PCT Pub. No.: WO2004/105438

PCT Pub. Date: Dec. 2, 2004

(65) Prior Publication Data

US 2007/0012685 A1    Jan. 18, 2007

(30) Foreign Application Priority Data

May 19, 2003  (FR) .................................. 03 05978

(51) Int. Cl.
 *F24H 1/10* (2006.01)
(52) U.S. Cl. ...................... 392/479; 392/465
(58) Field of Classification Search ...................... None
See application file for complete search history.

(56) References Cited

U.S. PATENT DOCUMENTS

| | | | |
|---|---|---|---|
| 4,199,675 A * | 4/1980 | Sharpless | 392/484 |
| 4,975,559 A | 12/1990 | Frisch | |
| 5,265,318 A * | 11/1993 | Shero | 29/447 |
| 6,459,854 B1 * | 10/2002 | Yoakim et al. | 392/479 |
| 6,943,325 B2 * | 9/2005 | Pittman et al. | 219/481 |
| 7,137,806 B2 * | 11/2006 | Babin et al. | 425/549 |
| 2002/0050490 A1 * | 5/2002 | Pittman et al. | 219/481 |
| 2002/0141742 A1 | 10/2002 | Beaulieu | |
| 2003/0044173 A1 * | 3/2003 | Natsuhara et al. | 392/479 |

FOREIGN PATENT DOCUMENTS

| | | |
|---|---|---|
| EP | 0 485 211 A1 | 5/1992 |
| EP | 1 067 822 A1 | 1/2001 |
| FR | 2 778 729 | 11/1999 |
| GB | 2 135 052 A | 8/1984 |
| JP | 58-106351 A | 6/1983 |
| WO | WO01/96090 | * 12/2001 |

* cited by examiner

*Primary Examiner*—Thor S. Campbell
(74) *Attorney, Agent, or Firm*—Browdy and Neimark, PLLC

(57) ABSTRACT

A device for heating a liquid for a domestic appliance, comprising a main body (1) which is connected to a reservoir of liquid and associated with an additional element (3) covering a surface of the main body (1) in order to define a liquid circulation volume, characterized in that the main body exhibits a thermal inertia which is lower than that of aluminum and in that the additional element (3) has a serigraphed heating resistor on the surface opposite the surface facing the main body (1).

14 Claims, 2 Drawing Sheets

DEVICE FOR HEATING A LIQUID FOR DOMESTIC APPLIANCE, DOMESTIC APPLIANCE FITTED WITH SAID DEVICE

TECHNICAL FIELD

The invention relates to the industry of household electric appliances. It is directed more particularly to appliances for household use requiring the heating of a liquid to a temperature lower than that of passage into the vapor phase, and more particularly of water. Among these appliances one can cite electric coffeemakers, espresso machines, hot beverage distributors requiring the rapid production of water at a temperature between 60° C. and 90° C.

The invention more specifically relates to a structure of the device for heating the liquid, which allows a heating of the liquid in a time significantly shorter than that of existing devices.

PRIOR TECHNIQUES

In a general manner, appliances requiring the uninterrupted production of hot water have heating devices that include electric resistances that are associated with a heating body, so as to transmit to this latter a certain quantity of heat energy. This heating body has a water circulation circuit, so that when water traverses the heating body, it receives a part of the energy provided by the resistance. Multiple architectures have already been proposed to arrange the circulation circuit as well as the resistance within the heating body. Thus, currently, the resistance is embedded inside the heating body, which is made of a metal, and typically aluminum.

To avoid any electric risk, this resistance is generally sheathed, then embedded, brazed or crimped in the mass of the heating body.

The water circulation circuit can be realized in various ways, and in particular be formed by a tube itself integrated, for example by molding in the heating body.

The whole of the systems known to date present multiple disadvantages, and in particular a strong thermal inertia, owing to the fact that the resistance is embedded in the heating body, and that it must be sheathed. A long phase of preheating is thus absolutely necessary to bring the heating body up to temperature, before it can ensure the heating of the liquid that traverses it.

In other words, it is impossible with the existing systems to obtain hot water practically from the beginning of the cycle of operation.

Because of this thermal inertia, it is also necessary to ensure a cyclic supplying of the resistance by a regulating thermostat, to maintain the heating body at constant temperature, even in the phases of non-utilization, and this in order to be able to benefit from sufficiently hot water as of the entry into a new phase of use.

These disadvantages are found in the devices described in the document EP 0 345 528, which have a main heating body, inside of which is embedded a sheathed resistance. This heating body is associated with an additional element, forming a lid, in a manner to define a volume for circulation of the liquid. The central body can be either flat, or cylindrical. Such an arrangement has a strong thermal inertia, since the heating resistance is embedded within material forming the heating body, with the disadvantages evoked herebefore.

In the field of household electric appliances implementing water heating, there are also known boilers such as those described in the document WO 99/59453. This type of boiler has a chamber cylindrical in volume, whose wall is equipped in its lower part with a localized resistance. This resistance screen printed on the wall of the chamber causes the heating of the liquid contained in the chamber. This type of boiler of large volume cannot of course eliminate the time for preheating the boiler, so that it does not make it possible to obtain water at sufficient temperature as of the starting of the device. Moreover, it is advisable to provide a temperature control to maintain, by long cycles of supply of thermal energy, the temperature at a predetermined assigned value.

A first problem that the invention seeks to solve is that of reducing time starting from the turning on of the device for heating, at which water or more generally the liquid is at sufficient temperature.

Another problem which the invention seeks to solve is that of limiting as much as possible the losses of energy in the phases of non-utilization of a heating appliance.

Another problem which the invention seeks to solve is to limit the supply of heat energy to the bare minimum for obtaining a liquid at the desired temperature.

The structure of the device for heating must however remain simple and of modest manufacturing cost.

SUMMARY OF THE INVENTION

The invention thus relates to a device for heating a liquid for household electric appliances. In a known way, such a device has a main body connected to a reservoir for liquid, and which is associated with an additional element covering one of its faces, to define a liquid circulation volume.

In accordance with the invention, the main body presents a thermal inertia lower than that of aluminum and the additional element has a heating resistance screen printed on its face opposed to that facing the main body.

By thermal inertia (Ith), one understands the capacity of a body to store more or less heat, which can be expressed by the product of the value of its mass density ($\rho$) by the value of its specific thermal capacity, (cp).

$$Ith = \rho \times cp$$

For this reason, one finds that metal bodies usually present a high thermal inertia, if only by their high mass density. In other words, according to the invention the main body is a sort of thermal insulator in that, during a heating phase, it takes much less heat than the liquid in circulation.

Advantageously, this main body is made of plastic.

Advantageously, the additional element presents a high transversal thermal conduction coefficient, for example higher than 40. By transversal thermal conduction coefficient (Cth), one understands the ratio of the value of the thermal conductivity coefficient ($\lambda$) of the material of the additional heating element divided by the value of its thickness (e) expressed in millimeters.

$$Cth = \lambda/e$$

In other words, the additional element very quickly transmits by conduction the heat energy of the heating resistance to the liquid, either in that the thickness is reduced, of the order of 3 mm for a material like aluminum with a high coefficient of conductivity, or in that the thickness is very reduced, of the order of a millimeter, for a material having a lower coefficient of conductivity like stainless steel.

Incidentally, the fact that the heating resistance is of the screen printed type and this in combination with the good transversal thermal conduction coefficient causes the additional heating element to also present a low thermal inertia, decreasing the energy losses. Now, this type of screen printed heating element makes it possible to achieve a uniform heating over a large surface facing the liquid, which increases its general thermal conductivity effectiveness.

In other words, the heating device has a main body which is relatively thermally insulating, and which is covered by a rapid heating element. This heating element thus transmits heat energy to the liquid circulating in the space that separates it from the main body. Because of the high coefficient of thermal transfer by conduction of the additional element, the bulk of the energy dissipated by the screen printed resistance is transmitted to the liquid in circulation, rather than accumulating in the additional heating element. Similarly, the main heating body has a low thermal inertia, so that it stores only a small quantity of energy coming from the heating element.

It follows that the liquid receives very quickly and in a quasi integral way the heat energy coming from the screen printed resistance, so that the heating of the liquid is quasi instantaneous. Similarly, the main body practically does not take part in the phenomena of heating of the liquid, so that when the device is not in operation, it is not necessary to provide a quantity of energy to maintain it at a sufficient temperature.

In other words, the consumption of the heating device is null apart from the phases of heating themselves. In a corollary way, it is practically not necessary to carry out long preheating phases at the beginning of the use of the device, since the heating body does not need to receive a significant quantity of energy to arrive at the temperature of use.

In practice, the principle of the invention can be implemented on heating devices having various geometries. Thus, in a first embodiment, the central body can be cylindrical, and can receive on its outer face the additional heating element forming a sleeve.

In another embodiment, the central body can be flat, and then receives an equally flat heating element.

To increase the effectiveness of the device, it can be provided that the main body has a groove making it possible to define with the additional element a liquid circulation channel, thus increasing the path followed by the latter within the heating device, and thus its capacity to receive heat energy.

For the same purpose, the screen printed resistance advantageously can be localized in line with the liquid circulation channel.

In practice, when the device is of generally cylindrical form, the groove can be helical, while when the central heating body is flat, the groove then can be in the form of a spiral.

In the same spirit, the main heating body can be hollow, so as to further limit its mass, therefore its thermal inertia.

Advantageously, a temperature sensor is arranged on the additional element, and the heating device comprises an electric and/or electronic circuit controlling the temperature of the additional body to a set point, preferably ranging between 70 and 90° C.

Owing to the fact that the additional element has a high transverse conductivity and that the main body and the additional element present a low thermal inertia, the electric and/or electronic regulation is particularly dynamic, quasi permanent, causing the liquid to leave at a rather stable temperature with a minimized energy consumption.

BRIEF DESCRIPTION OF THE FIGURES

The manner of carrying out the invention, as well as the advantages that result therefrom will clearly appear from the description of the embodiment that follows, with the aid of the attached figures in which.

MANNER OF CARRYING OUT THE INVENTION

Figure 1:
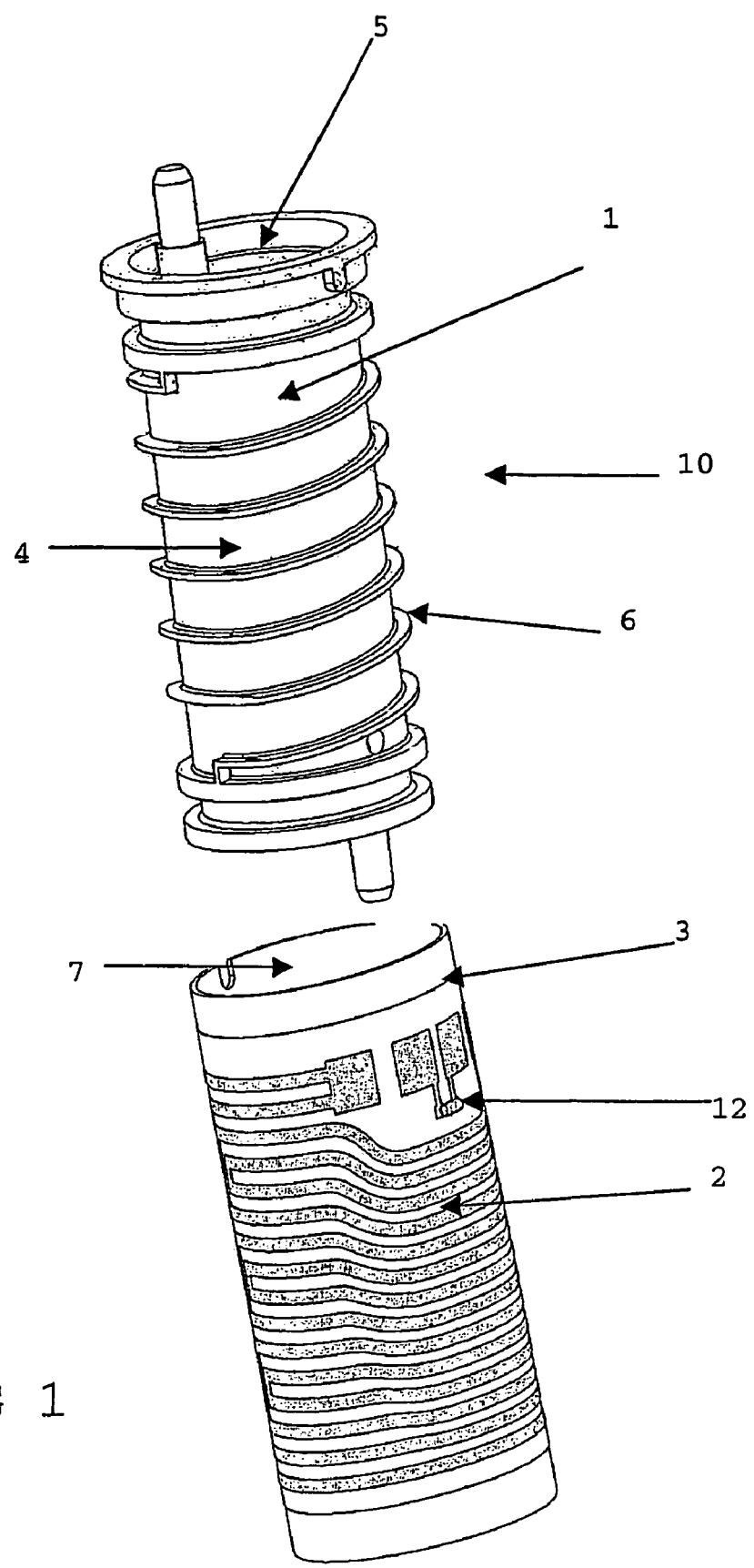
FIG. 1 is an exploded perspective view of the heating device according to the invention, shown before assembly.
Figure 2:
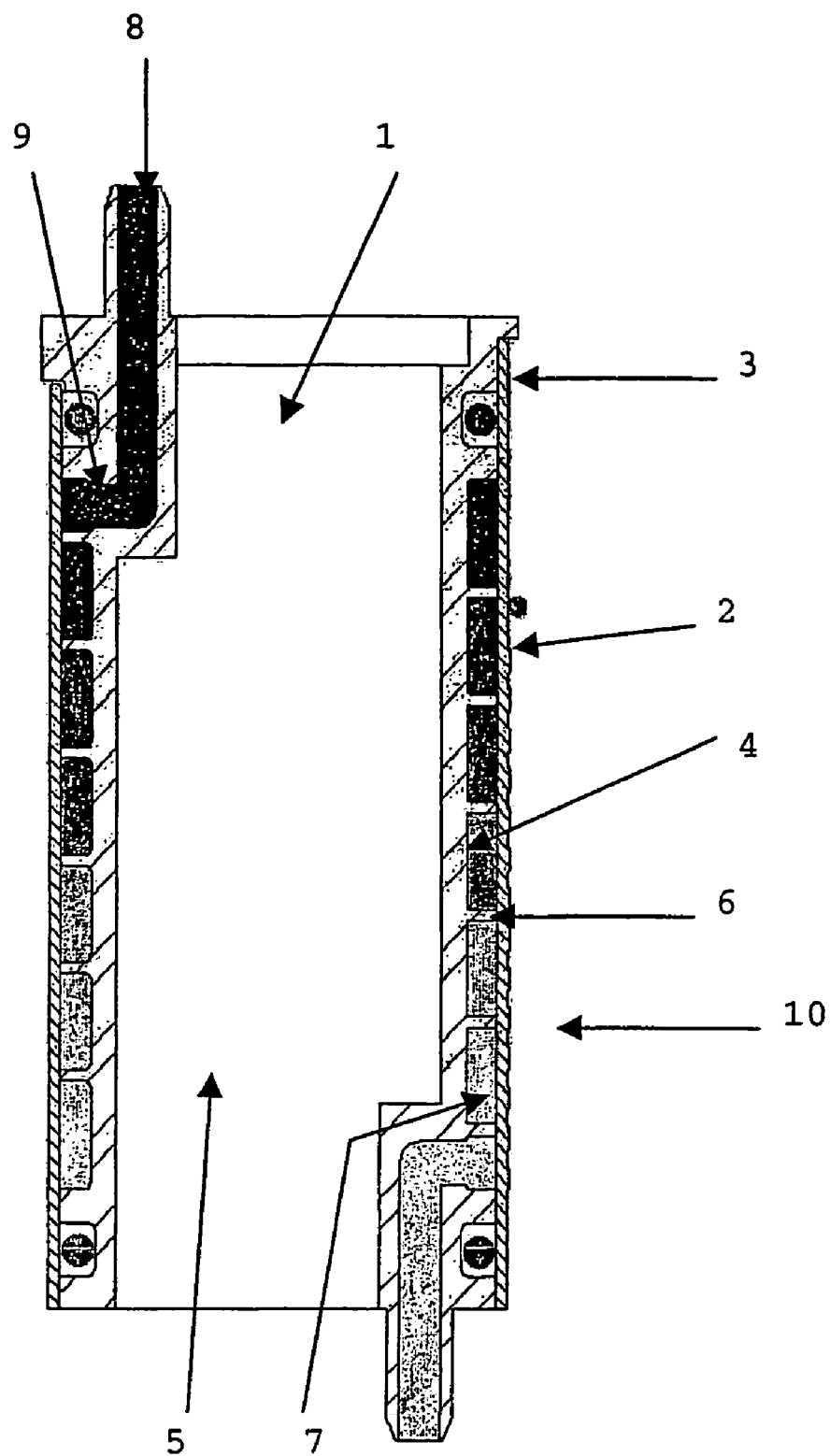
FIG. 2 is a longitudinal cross-sectional view of the heating device of FIG. 1, shown in an assembled configuration.

FIGS. 1 and 2 illustrate an embodiment of the invention in which the device for heating is cylindrical.

In this case, the device (10) has a central main body (1) associated with an additional heating element (3) in the form of a cylindrical sleeve. The space defined between the outer face (6) of the central main body (1) and the inner face (7) of the sleeve (3), forms the hollow cylindrical volume for circulation of the liquid.

In the illustrated form, the outer face of the central body (1) has a helical groove (4) that makes it possible to define with the sleeve a path for the liquid around the central body (1). However, in other embodiments, not represented, the outer face of the central body (1) can be completely cylindrical, so as to define with the sleeve a circulation volume of constant thickness, extending along the cylinder. Other alternatives can be envisioned without departing from the framework of the invention.

In practice, the central main body (1) is as illustrated in FIG. 2, connected to a cold water supply (8). This inlet (8) is connected to the outer face (6) by a substantially radial channel (9), which opens on the outer face (6).

The central main body (1) is preferably made of plastic, or more generally of a material having a low thermal inertia Ith, in any case lower than that of aluminum of the order of 2.30, so as to store only a small part of the heating energy. As material that can be suitable for producing the main body according to the invention, there can be cited polyamide (Ith=1.9), polyacetal (Ith=2), polypropylene (Ith=1.6), poysulfone (Ith=1.4) or polycarbonate (Ith=1.5).

In the form illustrated in FIG. 2, it is seen that the central main heating body (1) presents a central cavity (5), intended to decrease its weight even more, therefore its thermal inertia.

In the example illustrated in FIGS. 1 and 2, the groove (4) has a depth of about 3 millimeters, and a width of approximately 8 millimeters. This groove (4), presents a helical geometry, with a pitch of approximately 9 millimeters. In other words, the depth is smaller than the width in such a manner as to "spread out" the liquid against the additional heating element and thus to aid the transfer of heat.

Preferably, the sleeve (3) is made in a manner to present a high transversal thermal conductivity and a low thermal inertia.

The thickness of the sleeve (3) is reduced to the minimum according to the base material to decrease this thermal inertia, and to increase the phenomena of conduction. Among materials giving good results in terms of thermal properties, there can be cited copper, stainless steel, aluminum or glass. It is important that the sleeve (3) allow the deposit of a screen printed heating electric resistance (2).

The method for fabrication of the heating tracks consists in screen printing one or more layers of insulating material, then a layer of conductive paste according to a particular path, a layer to form contact pins and finally one or more layers of insulating material. The power available can be about 2000 W.

This electric resistance (2) thus forms a ribbon which, in the illustrated form, is arranged in the form of transverse circles with shifting along the same longitudinal line: the entire inner surface of the sleeve forms a heating plate against which the grooves force the liquid to flow. If desired, the screen printed resistance can be helical, and can be found to be in line with the channels defined by the groove (4) of the main heating body (1). In this case, the effectiveness of the heating and its speed are improved.

Thus, for a stainless steel sleeve having an outer diameter of about 45 mm, the thickness of the sleeve (3) can advantageously be comprised between 0.5 and 1.5 millimeters, preferably between 0.8 and 1 millimeter. Its transverse thermal conduction coefficient Cth is then of the order of 60. The advantage of stainless steel is its corrosion resistance and its behavior at high temperature facilitating the fabrication of flat heating elements.

The use of an aluminum sleeve is possible, but with heating elements on a support of polyimide and pastes with a lower baking temperature. For example, for an aluminum sleeve with a thickness of about 3 millimeters allowing the fabrication of screen printed heating elements, its thermal conduction coefficient Cth is about 70.

In practice, the circulation of water in the path along the outer face of the main body can be carried out either only by gravity, or by the intermediary of a pump.

Usefully, a temperature gauge (12), such as a NTC resistance, is brought against the additional heating element and is connected to an electronic circuit controlling the power supply of the resistive heating tracks in such a manner as to maintain this heating element in the form of a sleeve at a predetermined temperature during the period of water circulation.

At the time of a first startup with a cold heating device, the regulation controls a rapid preheating, of the order of 2 to 3 seconds, before the beginning of water circulation. This preheating, particularly fast and almost imperceptible to the user, results from the very low total thermal inertia of the device and from its efficiency of thermal transfer essentially towards the water contained in the circuit.

After many laboratory tests, it proved that, to obtain hot water at 80° C. at the outlet, it was sufficient to control thereafter, during flow of the liquid, the temperature of the additional element heating to a set point equal to that desired for the liquid simply increased by a constant value, for example of 30° C.

When the heating device is fed by means of a pump, this latter can take part in the regulation. In effect, if the flow of the pump proves too low, the temperature of the sleeve rises above its set point causing turn-off of the heating element while leaving the pump running. On the other hand, if the flow of the pump proves too high, the temperature of the sleeve will drop and a control will momentarily stop the pump.

In practice, measurements taken with this type of heating device make it possible to obtain a heating of approximately 25 centiliters of water to a temperature ranging between 70 and 80° C. in only 6 to 7 seconds. The preheating phase, only optional, is particularly reduced, since the beginning of flow can intervene at the latest around three seconds after starting the heating device.

It results from the preceding that the device according to the invention presents multiple advantages, and in particular that of having a particularly reduced thermal inertia. It thus follows that water circulating in the device heats in a quasi instantaneous manner upon supplying voltage to the heating resistance.

Upon disconnecting voltage from the resistance, the heating device cools quickly thanks to its low thermal inertia, thus protecting the immediate surroundings from heating and also facilitating the outlet temperature control.

The use of the screen printed resistance also ensures a distribution of the heating power over a larger surface compared to the existing solutions, so as to optimize the thermal transfer.

As an alternative, the central body can be flat and receive an equally flat heating element. In this case, the face by the central body facing the heating element is supplemented of a groove in the shape of a spiral, cold water arriving at the center, hot water leaving at the periphery, or conversely.

The invention claimed is:

1. Device for heating a liquid for a household electric appliance, having a main body (1) provided with an inlet for receiving a liquid from a supply, and an additional element (3) covering a face of the main body (1) to define a liquid circulation volume between said main body and said additional element, said liquid circulation volume being in communication with said inlet, wherein the main body presents a thermal inertia lower than that of aluminum and said additional element (3) has a heating resistance (2) screen printed on its face opposed to that facing the main body (1).

2. Device for heating according to claim 1, wherein the main body (1) is made of plastic.

3. Device for heating according to claim 1, wherein the additional element (3) made of metallic material presents a transversal thermal conduction coefficient (Cth) higher than 40.

4. Device for heating according to claim 3, wherein the additional element (3) is made of stainless steel with a thickness comprised between 0.5 and 1.5 millimeters.

5. Device for heating a liquid for a household electric appliance, having a main body (1) connected to a reservoir for liquid, and associated with an additional element (3) covering a face of the main body (1) to define a liquid circulation volume, wherein the main body presents a thermal inertia lower than that of aluminum, and said additional element (3) has a heating resistance (2) screen printed on its face opposed to that facing the main body (1), wherein the main body (1) has a groove making it possible to define with the additional element (3) a channel (4) for circulation of the liquid.

6. Device for heating according to claim 5, wherein said screen printed resistance (2) is localized substantially in line with the liquid circulation channel (4).

7. Device for heating according to claim 5, wherein the main body (1) is flat and in that the groove is in the form of a spiral.

8. Device for heating according to claim 1 wherein the main body (1) is cylindrical, and receives on its outer face the additional element (3) in the form of a sleeve.

9. Device for heating according to claim 5 wherein the groove is helical.

10. Device for heating according to claim 8, wherein the main cylindrical body (1) is hollow.

11. Device for heating according to claim 1 wherein a temperature sensor (12) is arranged on the additional element, and in that the device comprises an electric/electronic circuit connected to the heating resistance in order to control the temperature of the additional body.

12. Device for heating according to claim 3, wherein the additional element (3) is made of stainless steel with a thickness comprised between 0.8 and 1 millimeter.

13. Device for heating according to claim 1, wherein the liquid is water and said device further comprises a reservoir constituting the supply and connected to supply the water to said inlet.

14. Device for heating according to claim 5, wherein the liquid is water, and said liquid circulation volume is defined between said main body and said additional element and is connected to receive the water from the reservoir.

* * * * *